(12) United States Patent
Peters et al.

(10) Patent No.: US 8,041,566 B2
(45) Date of Patent: Oct. 18, 2011

(54) TOPIC SPECIFIC MODELS FOR TEXT FORMATTING AND SPEECH RECOGNITION

(75) Inventors: Jochen Peters, Aachen (DE); Evgeny Matusov, Aachen (DE); Carsten Meyer, Aachen (DE); Dietrich Klakow, Saarbrücken (DE)

(73) Assignee: Nuance Communications Austria GmbH, Vienna (AT)

( * ) Notice: Subject to any disclaimer, the term of this patent is extended or adjusted under 35 U.S.C. 154(b) by 1139 days.

(21) Appl. No.: 10/595,830

(22) PCT Filed: Nov. 12, 2004

(86) PCT No.: PCT/IB2004/052403
§ 371 (c)(1),
(2), (4) Date: Mar. 2, 2007

(87) PCT Pub. No.: WO2005/050621
PCT Pub. Date: Jun. 2, 2005

(65) Prior Publication Data
US 2007/0271086 A1    Nov. 22, 2007

(30) Foreign Application Priority Data
Nov. 21, 2003 (EP) .................................. 03104314

(51) Int. Cl.
*G10L 15/00* (2006.01)
(52) U.S. Cl. ....................................................... 704/236
(58) Field of Classification Search .................. 704/236, 704/9, 10
See application file for complete search history.

(56) References Cited

U.S. PATENT DOCUMENTS

| | | | | |
|---|---|---|---|---|
| 5,809,318 A * | 9/1998 | Rivette et al. | .................. | 715/202 |
| 5,950,214 A * | 9/1999 | Rivette et al. | .................. | 715/202 |
| 5,991,780 A * | 11/1999 | Rivette et al. | .................. | 715/255 |
| 6,052,657 A | 4/2000 | Yamron et al. | | |
| 6,104,989 A | 8/2000 | Kanevsky et al. | | |
| 6,279,017 B1 * | 8/2001 | Walker | .......................... | 715/201 |
| 6,529,902 B1 * | 3/2003 | Kanevsky et al. | .................... | 1/1 |
| 2002/0087315 A1 | 7/2002 | Lee et al. | | |
| 2002/0091713 A1 * | 7/2002 | Walker | .......................... | 707/200 |
| 2003/0018668 A1 * | 1/2003 | Britton et al. | ................. | 707/513 |
| 2003/0145282 A1 * | 7/2003 | Thomas et al. | ................. | 715/513 |

OTHER PUBLICATIONS

International Search Report in corresponding PCT application IB2004/052403 of Jul. 15, 2005.

\* cited by examiner

*Primary Examiner* — Michael N Opsasnick
(74) *Attorney, Agent, or Firm* — Wolf, Greenfield & Sacks, P.C.

(57) ABSTRACT

The present invention relates to a method, a computer system and a computer program product for speech recognition and/or text formatting by making use of topic specific statistical models. A text document which may be obtained from a first speech recognition pass is subject to segmentation and to an assignment of topic specific models for each obtained section. Each model of the set of models provides statistic information about language model probabilities, about text processing or formatting rules, as e.g. the interpretation of commands for punctuation, formatting, text highlighting or of ambiguous text portions requiring specific formatting, as well as a specific vocabulary being characteristic for each section of the recognized text. Furthermore, other properties of a speech recognition and/or formatting system (such as e.g. settings for the speaking rate) may be encoded in the statistical models. The models themselves are generated on the basis of annotated training data and/or by manual coding. Based on the assignment of models to sections of text an improved speech recognition and/or text formatting procedure is performed.

13 Claims, 7 Drawing Sheets

TOPIC SPECIFIC MODELS FOR TEXT FORMATTING AND SPEECH RECOGNITION

The present invention relates to the field of automatic text formatting and speech recognition. Both processes of speech recognition and text formatting make use of topic specific statistical models such as language models and formatting rules that are generated on the basis of annotated training data.

Speech recognition and speech transcription systems that transform a recorded speech signal into machine processible text are widely spread, e.g. in the medical sector and in legal practices. A spoken dictation is inputted into a speech to text transcription system in the form of a speech signal. The speech to text transcription system analyzes the speech signal and transforms recognized speech patterns into corresponding text blocks. Assignments between speech patterns and text blocks are provided by a database that can be customized to a user's preferences. Since the vocabulary of a dictation in a legal practice differs remarkably from the vocabulary of a dictation referring to a medical report, it is reasonable to supply a speech to text transcription system only with an appropriate set of databases that are related to the field of application of the speech to text transcription system.

However, the text that is finally outputted from a speech to text transcription system typically does not satisfy a pre-defined standard. For example dictated commands referring to punctuation, formatting or highlighting of text portions have to be interpreted instead of being literally transcribed by the system. In this case a punctuation command "full stop" has to be recognized and to be replaced by a "." Further examples of interpretation, disambiguation, and formatting tasks can be given for the processing of numbers within a dictation.

Depending on the context, a number either has to be transcribed in digits, as an enumeration, as a date etc. or as a literal word. For example, the term "two" in the expressions "number two colon", "two tablets of Aspirin", and "these two findings" has to be formatted as an enumeration, a digit, or as the literal word "two", respectively. This decision about the formatting or interpretation of ambiguous text portions can only be made in a context dependent fashion eventually incorporating various formatting standards being specific for different document types or different portions of a document. But since an automatic speech transcription system lacks sophisticated context specific knowledge of the input speech, a transcribed manuscript always requires careful proof-reading by a human proof reader which is rather time consuming and cost intensive.

Most typically a text document comprises a document structure that describes the evolution of the document's content. For example a medical report is typically segmented into sections like demographic header, family history, radiology, physical examination, medications. Each of these sections refers to a distinct content to which certain text formatting or text interpretation rules apply. For example in the beginning section of a medical report, the probability that a dictated number refers to a date, an address or to a date of birth which has to be written in digits is much higher than a probability of a digit occurring in the "patient history" section. Furthermore, in a "demographic header" section, the probability of a number being formatted in digits is higher than the probability of its formatting as a literal word. This knowledge thus helps to decide for the most likely formatting style for an ambiguous event, such as the exemplary number.

Since ordinary speech recognition and text formatting procedures do not feature any kind of context specific expertise and do not exploit knowledge about the (semantic) content of a section or document being processed, critical decisions concerning recognition and/or formatting that refer to ambiguous text portions and that are performed by these procedures typically exhibit a high error rate.

U.S. Pat. No. 6,052,657 discloses a technique of segmenting a stream of text and identifying topics in the stream of text. The technique employs a clustering method that takes as input a set of training text representing a sequence of sections, where a section is a continuous stream of sentences dealing with a single topic. The clustering method is designed to separate the sections of input text into a specified number of clusters, where different clusters deal with different topics.

The technique features segmenting a stream of text that is composed of a sequence of blocks of text (e.g. sentences) into segments using a plurality of language models. This segmentation is done in two steps: First, each block of text is assigned to one cluster language model. Thereafter, text sections (segments) are determined from sequential blocks of text that have been assigned to the same cluster language model.

Segment boundaries in the stream of text are then identified in the second step as corresponding to language model changes in the selected sequence of language models, i.e. topic transitions.

Text segmentation and topic annotation is also provided by the patent application "Text segmentation and topic annotation for document structuring", which is filed by the same applicant concurrently herewith. This document describes a text segmentation and topic annotation procedure that takes into account a text emission probability, a topic sequence probability, a topic position probability and a section length probability. In this way a variety of statistic information provided by the training corpus can be extracted and effectively exploited for improved text segmentation and document structuring.

However, these techniques retrieve and identify sections of text and provide an association of these text sections with a context specific topic, but make no further usage of the gathered context specific and/or structural information.

The present invention aims to provide an improved method for speech recognition and text formatting by making explicit use of context specific and/or structural information of a text or speech input.

The invention provides a method of modifying a text by using a plurality of statistical models such as language models or text processing (formatting) rules that are generated on the basis of training data. The method comprises the steps of segmenting the text into a plurality of sections, assigning one statistical model of the plurality of statistical models to each section, and finally performing a text modification procedure for each section with respect to the statistical model being assigned to the section.

According to a preferred embodiment of the invention, the statistical model being assigned to a section of the text provides a set of text formatting rules being descriptive of distinct text formatting rules that are specific for each section. Each statistical model refers to a content dependent topic of the text. When for example a section of text is identified as an opening section, this opening section is assigned to a topic indicating the content of this section, i.e. that the section refers to an opening part of the text. Additionally, each of the plurality of statistical models is assigned to a content specific topic and depending on the established correlation between a statistical model and a text section, the text modification procedure performs a section-wise text formatting procedure based on the text formatting rules provided by the statistical model being assigned to each text section.

For the above example of an opening section of a medical report, this set of formatting rules may provide a formatting rule specifying that each number that is recognized in this particular text section has to be transcribed in digits. Such a formatting rule is reasonable because the probability that some date or an address number occurs within the opening section of a document is much higher than the probability for a number that has to be transcribed by a literal word. Referring to other sections such as "findings", a preferred formatting rule for numbers might define to transcribe a number as enumerations since these are more frequently found in such sections. Of course, each rule may have further content dependencies, so that not all numbers have to be treated in the same way per topic. The above examples should thus be considered as "default rules" which may have exceptions.

According to a further preferred embodiment of the invention, the term "statistical model" refers to any knowledge source used for speech recognition and/or formatting. Additional to the text formatting rules a statistical model also comprises a language model providing statistical information of words or phrases that are characteristic for each section of text. The language model in turn makes use of a topic specific vocabulary providing words or sets of words that are characteristic for each text section. For example a statistical model which is especially trained for the opening section of a medical report encodes the information about typical words or formulations used in this opening section. Besides, a specific vocabulary further improves the prior knowledge about the expected words in such a section thus reducing the chance of missing or misrecognizing some unknown word. For example a language model of a statistical model being specified for an opening section of a medical report typically provides a set of street and city names, because the likelihood that street or city names occur in the beginning section of a medical report is much higher compared to other sections relating to e.g. a medical treatment.

All statistical models are trained on the basis of annotated training data. Some sets of rules or language models can also be manually designed, optionally with statistical weights derived from training data. During the training process of each model or rule, a training corpus is statistically evaluated. In this way a language model being specified for an opening section of a document is specific about probabilities for words or phrases expected in such a section, and the set of rules specifies the distinct formatting rules that have to be applied to such a section. The training of language models is known in the prior art and can be performed according to e.g. U.S. Pat. No. 6,188,976 B1 "apparatus and method for building domain specific language models"

Some components such as the vocabulary or some formatting rule can be derived on the basis of statistical information, e.g. word counts in a training corpus, but may lack "statistical character" once they are created. Furthermore, some rules such as "convert each occurrence of 'full stop' to '.'" may be manually designed without statistical evidence. In any case, here any set of knowledge sources is briefly referred to as "statistical models" even if any of the models are not of statistical nature.

According to a further preferred embodiment of the invention, the text being subject to modification is obtained from a speech to text transcription system and typically features one large, unstructured stream of words which is literally transcribed from a spoken dictation. By making use of a text segmentation technique, the structure of the obtained text is extracted in order to assign associated information to each section of the text. More specifically, the recognized text is segmented into sections, each of which being assigned to a topic which in turn is associated with statistical models such as topic-dependent language models and/or text processing rules. Each of these models is specific for different sections of text, i.e. each language model or set of rules is customized to a particular content dependent topic assigned to text sections.

When the segmentation of the text generated from a first speech recognition pass has been performed and the assignment of the appropriate models to each text section has been accomplished, the text modification procedure can be performed for each section with respect to the models being assigned to the section. A second recognition pass may eliminate recognition errors, and a section-wise formatting with the associated rules may improve the results as compared to a topic-insensitive formatting or text processing.

According to a further preferred embodiment of the invention, the text being subject to modification has been generated by a first speech transcription process also denoted as transcription pass. During the first speech recognition and transcription pass, the speech input has been literally transcribed into text in an ordinary way. It can be assumed that during this first speech recognition and transcription pass a number of recognition errors has occurred. The resulting partially erroneous text is then segmented into sections and each section is assigned to a specific topic which is associated with a specific language model.

The text modification procedure now comprises a second speech recognition pass by making explicit use of the language model being assigned to each section. This second speech recognition pass is performed section-wise, i.e. for each section of the text an appropriate language model is selected and the probabilities according to the selected language model are applied during the second speech recognition pass in order to eliminate errors that occurred during the first speech recognition pass.

The goal of this section-wise assignment of topic-specific models is twofold: Using specific language models and/or vocabularies, the recognition of the first pass may be improved in a second pass. Besides, the use of topic-specific text processing rules allows to better focus onto the particular formatting tasks that apply for that topic. If the same raw text may be formatted in different ways depending on the local content or topic, then the use of the locally "correct" model helps to disambiguate whether one or another formatting operation should be performed.

Therefore, the method of the present invention represents an effective approach to provide local topic information to the speech recognition process. Decisions related to ambiguous text portions which are prone to misrecognition and which normally require human expertise can therefore be performed automatically by the speech recognition system.

According to a further preferred embodiment of the invention, each statistical model assigned to a section has a topic specific vocabulary. In this way the speech recognition can be further improved by making use of a context dependent set of words which can be recognized. For example a vocabulary being customized for an opening section of a medical report may provide a list of words typically used in addresses, e.g. street names or city names, that are very unlikely to occur in other sections of the report. A carefully tailored, topic-specific word list reduces the number of unknown words and may considerably reduce the likelihood of word confusions.

As an alternative to a complete second recognition pass, a re-scoring of a multitude of text hypotheses generated during the first recognition pass can be performed using the statistical information provided by the topic-specific language model and/or by the topic-specific vocabulary.

In order to simplify the notation a combination of a topic specific language model and a topic specific vocabulary is simply referred to as topic specific "language model" which includes a topic specific vocabulary.

For both the full second speech recognition pass or the re-scoring of already generated hypotheses, words or phrases featuring a similar sounding but having a significantly different spelling or meaning can correctly be identified by making use of the statistical information stored in the section-assigned topic-specific language model. In this way the error rate due to mis-recognizing or inherent ambiguities can be reduced appreciably.

When for example a speech pattern of the speech either refers to a first or to a second word and when the mapping of the speech pattern to either of the words has a similar scoring, the method refers to the statistical information provided by the topic-specific language model indicating which of the two words is more likely to occur in the present section.

According to a further preferred embodiment of the invention, the section-wise selection of a topic specific statistical model further serves as a knowledge source for a text formatting procedure. Here, the formatting is performed with the rules provided by the selected statistical model.

Based on the assigned formatting rules, a formatting of the obtained (e.g. first or repeatedly recognized) text can be performed in a section-wise way. Numbers, explicitly dictated commands referring to text formatting or punctuation etc. can correctly be identified by making use of the statistical information provided by the section-assigned topic-specific set of formatting rules. In this way the method provides context specific statistical information that can be exploited in order to disambiguate inherently ambiguous text portions.

In this way, the method of the present invention can be applied to both speech recognition as well as to the text formatting procedure and universally exploits content specific statistical information for each section within a document.

According to a further preferred embodiment of the invention, a section of text which is assigned to a specific topic is used to adapt the statistical models associated with that topic, i.e. the topic-specific language model and/or the topic specific vocabulary and/or some topic-specific rules. This means that the models and their statistical information are not only based on the training data but moreover can be adapted to text and text content which is subject to application of the present invention. Hence the models are permanently trained through statistical analysis of assigned text sections. On the one hand the models can be adapted to unknown types of documents and on the other hand the performance and reliability of the speech recognition and/or text formatting procedure permanently increases.

According to a further preferred embodiment of the invention, already a first speech recognition process can make use of context specific information provided by a language model. Here, in a first step a speech recognition process is started in order to recognize a first portion of speech. This first portion of speech typically covering only a few words or a few sentences is already characteristic for the content of the underlying section. Based on this first portion of recognized speech, the method postulates a topic and assigns the associated language model to a first portion of text corresponding to the first portion of speech.

After assignment of the language model, the same language model is used for the proceeding speech recognition. In other words the method switches to a distinct language model on the basis of the first few characteristic words or sentences of a section. In this way the entire speech recognition process incorporating the exploitation of topic-specific information can be performed during a single speech recognition process. Compared to previously described embodiments of the invention making use of two successive passes of speech recognition or text formatting, this integrated method of speech recognition incorporating the postulation of language models might result in a less exact but more efficient process of speech recognition.

According to a further preferred embodiment of the invention, also a first text formatting procedure can already make use of context specific information provided by a language model. During the first text formatting procedure the inventive method postulates a topic and makes further use of the set of text formatting rules being associated to the postulated topic. Furthermore the text formatting procedure switches to this set of rules in order to perform a context specific text formatting.

According to a further preferred embodiment of the invention, the statistical models further comprise topic specific speech recognition parameters in order to provide a topic specific speech recognition pass. The speech recognition parameters refer to parameters that are of general relevance for a speech recognition pass and specify the adaptation of the speech recognition pass. The adaptation of a speech recognition pass refers to e.g. specific settings for the speaking rate, a topic-specific sound adaptation of the speech (e.g. if certain topics are dictated under specific acoustic conditions) or a topic-specific pronunciation lexicon. In this way topic specific dictation characteristics can effectively be accounted for. For example the method adapts to a different speaking rate when a speech portion referring to a distinct topic has been identified that is typically dictated with an increased or decreased dictation speed. Exploiting such a speed information provided by the statistical model allows an efficient topic specific speed adaptation of a speech recognition pass.

In the following, preferred embodiments of the invention will be described in greater detail by making reference to the drawings in which.

Figure 1:
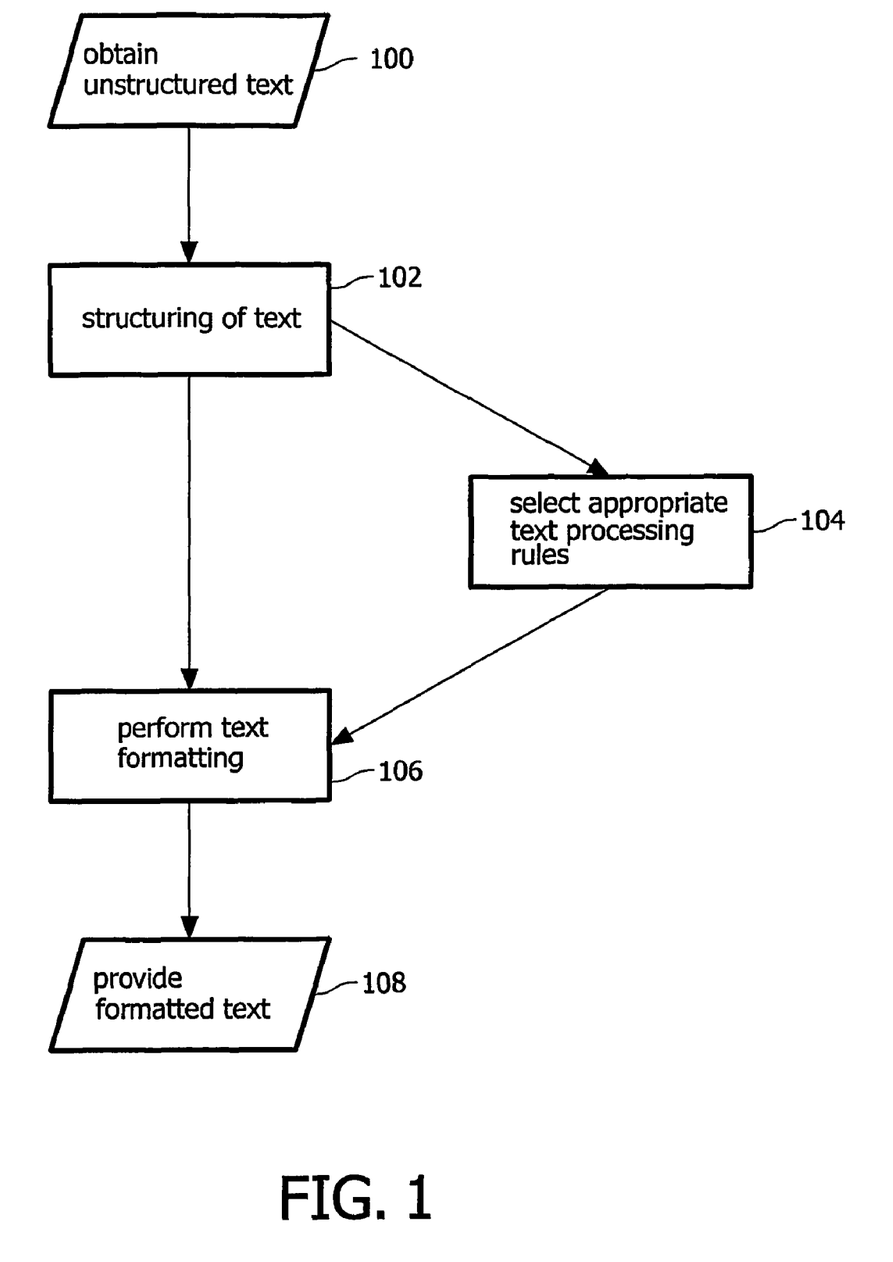
FIG. 1 is illustrative of a flow chart for performing a text formatting.

FIG. 1 illustrates a flow chart for formatting a text by making use of context specific formatting or text processing rules. In step 100 a completely or partially unstructured text is obtained. In the proceeding step 102 the obtained text is subject to automatic structuring. This structuring can be performed by standard techniques as for example described in U.S. Pat. No. 6,052,657 "Text segmentation and identification of topic using language models". Another, improved method of document structuring is disclosed in the Patent Application "Text segmentation and topic annotation for document structuring", which is filed by the same applicant concurrently herewith.

According to the structuring of text performed in step 102, in step 104 an appropriate set of rules is selected for each section of the structured text. The structured text of step 102 as well as the appropriate rules of step 104 are provided to step 106, in which a text formatting is performed. The text formatting of step 106 is accomplished in a section-wise way. Each section of text is formatted according to the selected rules. After the text formatting has been performed in step 106, the formatted text is provided in step 108. This can be performed in a manifold of different ways, such as storing the formatted text by some kind of storing means, illustrating the text by some kind of graphical display or projection means or by reproducing the text in the form of a print out.

Figure 2:
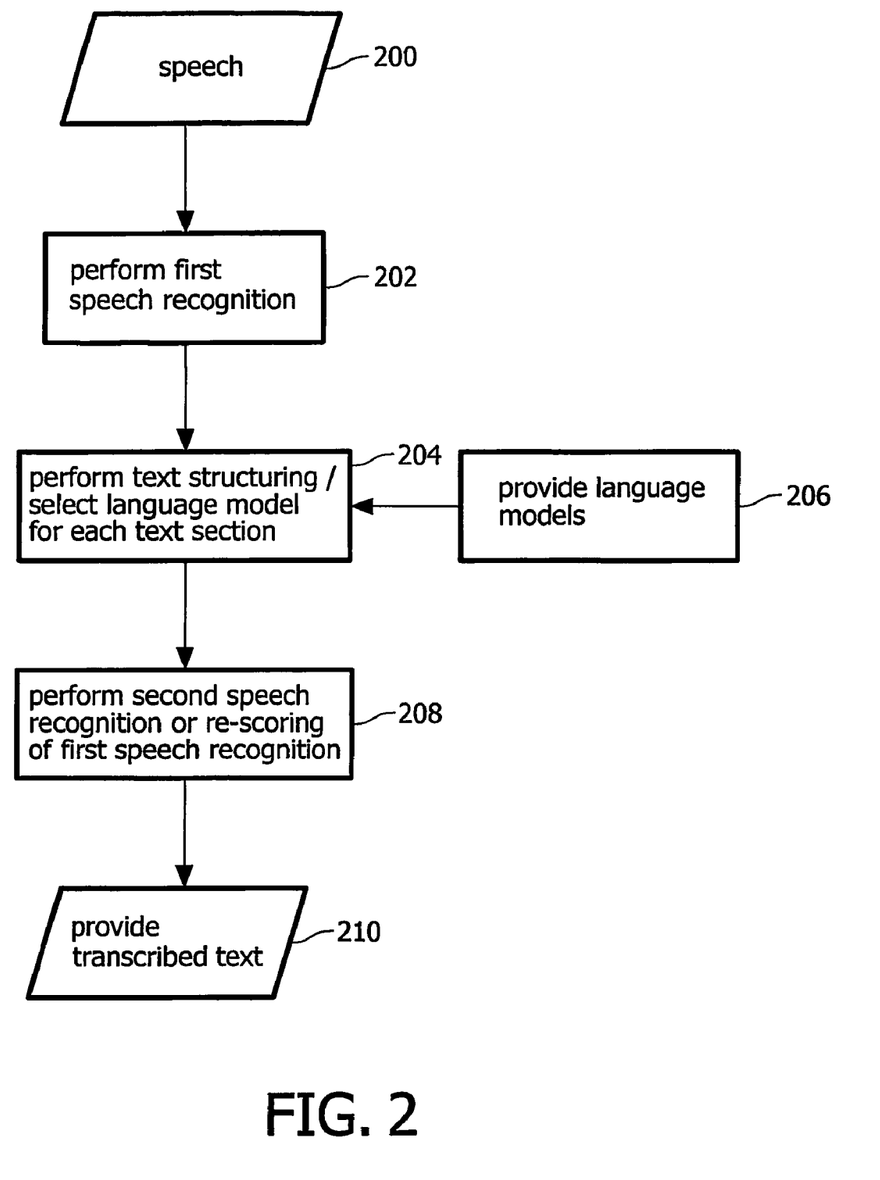
FIG. 2 is illustrative of a flow chart for performing a speech recognition.

FIG. 2 illustrates a flow chart for performing a speech recognition making use of text structuring and language model assignment. In the first step 200, a speech signal is obtained. Based on this speech signal in step 202, a first speech recognition pass is performed. This first speech recognition pass corresponds to a conventional speech recognition literally transcribing the obtained speech into text. The text, which is a product of the first speech recognition pass performed in step 202 is inputted in the next step 204, where the text becomes subject to text structuring. Furthermore in step 204 a text structuring as well as selection of an appropriate language model for each text section is performed.

The language models that are based on the annotated training corpus are provided to step 204 by step 206. In this way step 204 performs a structuring of the text into text sections and selects one of the language models provided by step 206 to each section of text. Based on the structuring and on the assignment of a language model to each section of text, a second speech recognition pass is performed in the following step 208. This second speech recognition pass of step 208 can either comprise a complete new recognition of the speech input or a re-scoring of various hypotheses generated during the first speech recognition pass performed in step 202. By making use of the language model being assigned to a section of speech, the second speech recognition pass in step 208 makes explicit use of statistical information provided by the language model in order to identify patterns of speech in the correct way.

After the second speech recognition pass has been performed by step 208 the transcribed text is provided by step 210 either by storing the text by some kind of storing means or by visualizing the text with the help of presentation techniques.

Figure 3:
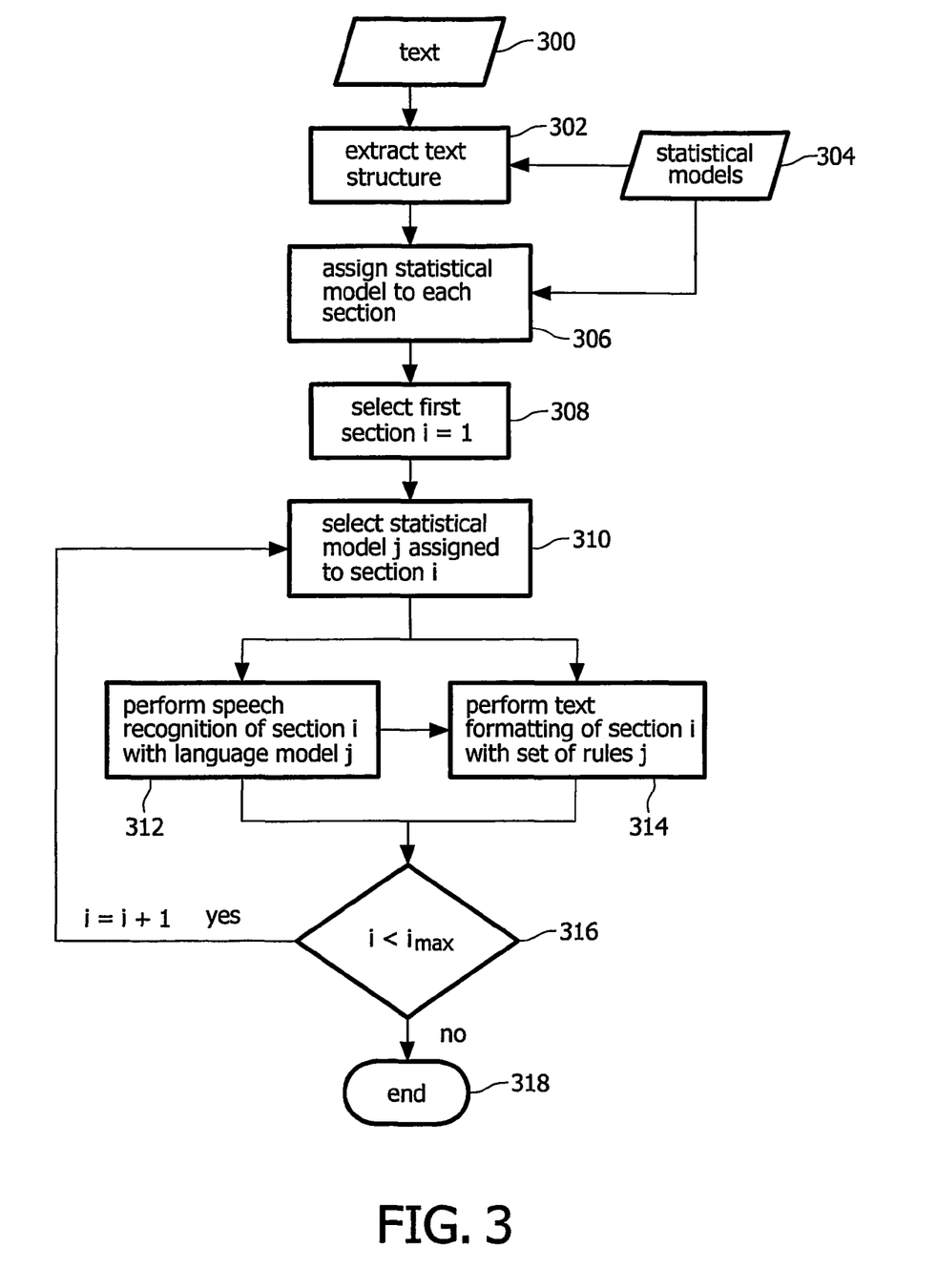
FIG. 3 is illustrative of a flow chart representing a speech recognition process in a more detailed way.

FIG. 3 shows a more detailed flow chart illustrating the speech recognition and/or the text formatting procedure of the present invention. In the first step 300 a text is obtained either from a speech-to-text transcription system or from some arbitrary source. In step 302 the structure of the text is extracted. The statistical models based on the training corpus are provided to the text structure extracting procedure of step 302 by the step 304. In this embodiment, the structuring of the text performed in step 302 makes explicit use of the statistical models that are provided by step 304. The statistical models are also provided to step 306 by step 304. After the text structuring of step 302 has been performed, in the proceeding step 306, a statistical model is assigned to each section of the text. The scale on which the segmentation of the text is performed can be defined with a granularity parameter specifying a finer or coarser segmentation of the text document. By means of the granularity parameter the level of segmentation can be controlled.

The following steps describe the section-wise text modification and/or speech recognition. In step 308 the first section of the text (i=1) is selected. The index i represents the single sections of text according to the text structuring of step 302. After the first section has been selected by step 308, a statistical model with model index j is assigned to the section i. The assignment of the statistical model j is performed corresponding to the assignment between statistical models and sections already performed in step 306. After the appropriate statistical model has been selected in step 310, the method either proceeds with step 312 or 314. Since the statistical model covers a language model for improved speech recognition and a set of rules for text formatting, the single steps select the appropriate knowledge base that is designed for their specific task to be performed in the steps 312 and 314.

In step 312 a second speech recognition pass of section i is performed with the language model j from the statistical model j. In step 314 in contrast a text formatting of section i is performed with the rule set j also from the statistical model j. Especially for the second, context specific, speech recognition pass performed in step 312, each language model provides a context specific vocabulary in order to provide topic specific recognition or re-scoring information for the speech recognition pass of step 312. In both steps 312 and 314 the selected statistical model j is explicitly exploited in order to eliminate errors in the text that were due to mis-recognition or misinterpretation. After the speech recognition of step 312 or the text formatting of step 314 has been performed, the method proceeds with step 316.

In step 316 the section i is compared to imax representing the last section of the text. If in step 316 i is less than imax, the section index i is incremented by 1 and the method returns to step 310. In the other case when in step 316 the section index i equals imax the method ends in step 318. This last step is performed, when each section of the text has been subject to speech recognition and/or text formatting. Whether after step 310 a speech recognition is performed in step 312 or a text formatting procedure is accomplished in step 314 must be specified in a predefined way by a user. For the entire text, i.e. for all sections i=1 . . . imax, the method either performs step 312 or the step 314 which means that either a speech recognition or a text formatting is performed on the basis of the statistical models being assigned to sections of text.

Alternatively, a combination in which a text formatting step described in step 314 follows a speech recognition step 312 is also conceivable. In this case, the method first performs a speech recognition in step 312 and successively switches from step 312 to step 314, where a text formatting procedure is performed. In this case, the switching from step 312 to step 314 incorporates a switching between the language model and the set of rules both associated to the same statistical model j assigned to the relevant section of text i.

Figure 4:
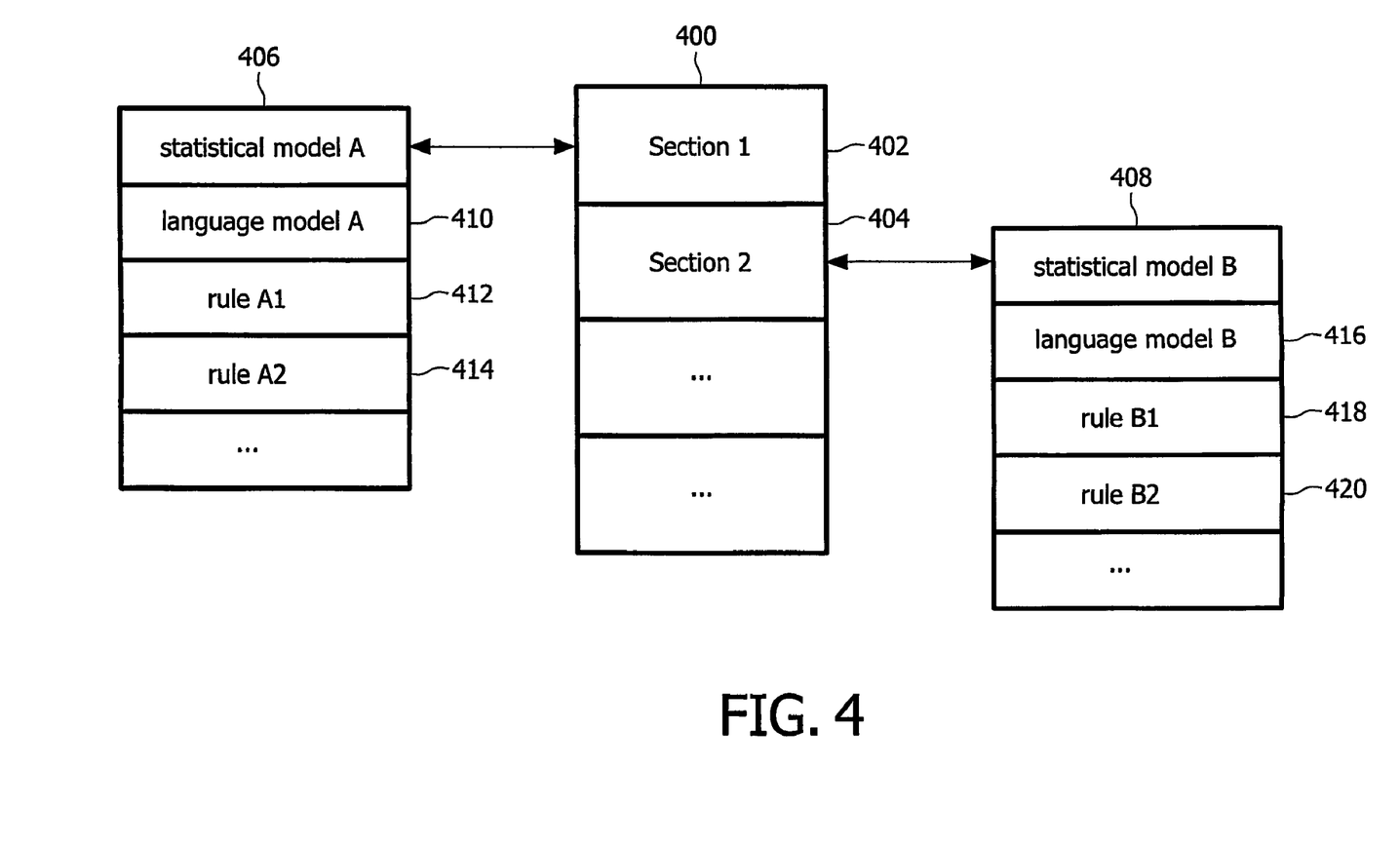
FIG. 4 is illustrative of a block diagram of text segmented into sections being assigned to different language models.

FIG. 4 illustrates a block diagram in which a text 400 is segmented into sections 402, 404, . . . Each section 402, 404 of the text 400 is assigned to a set of statistical models 406, 408. In this case the first section 402 is assigned to the statistical model 406 and the second section 404 is assigned to the statistical model 408. Each of the statistical models 406, 408 has a language model 410, 416, a first rule 412, 418, a second rule 414, 420 as well as other rules not further specified. Each language model 410, 416 has a context specific vocabulary in order to provide topic specific recognition or re-scoring information for the context specific speech recognition pass.

The first rule 412 of the statistical model 406 which is assigned to the first section 402 of the text 400 may for example specify that any number within the section 402 has to appear in digits. In a similar way the language model 410 of the statistical model 406 is specified for section 402 of the text 400. When for example this first section 402 represents an opening section of the text 400, it is reasonable that the language model 410 of the statistical model 406 emphasizes on street and/or city names that typically occur at the beginning of a medical report. In a similar way the statistical model 408 is assigned to the second section 404 of the text 400. When the second section 404 represents a "physical examination" section within a medical report, the statistical model 408 is selected among a list of models in such a way that the language model 416 of the statistical model 408 provides a multiplicity of medical terms that are typically used in a "physical examination" section 404.

Figure 5:
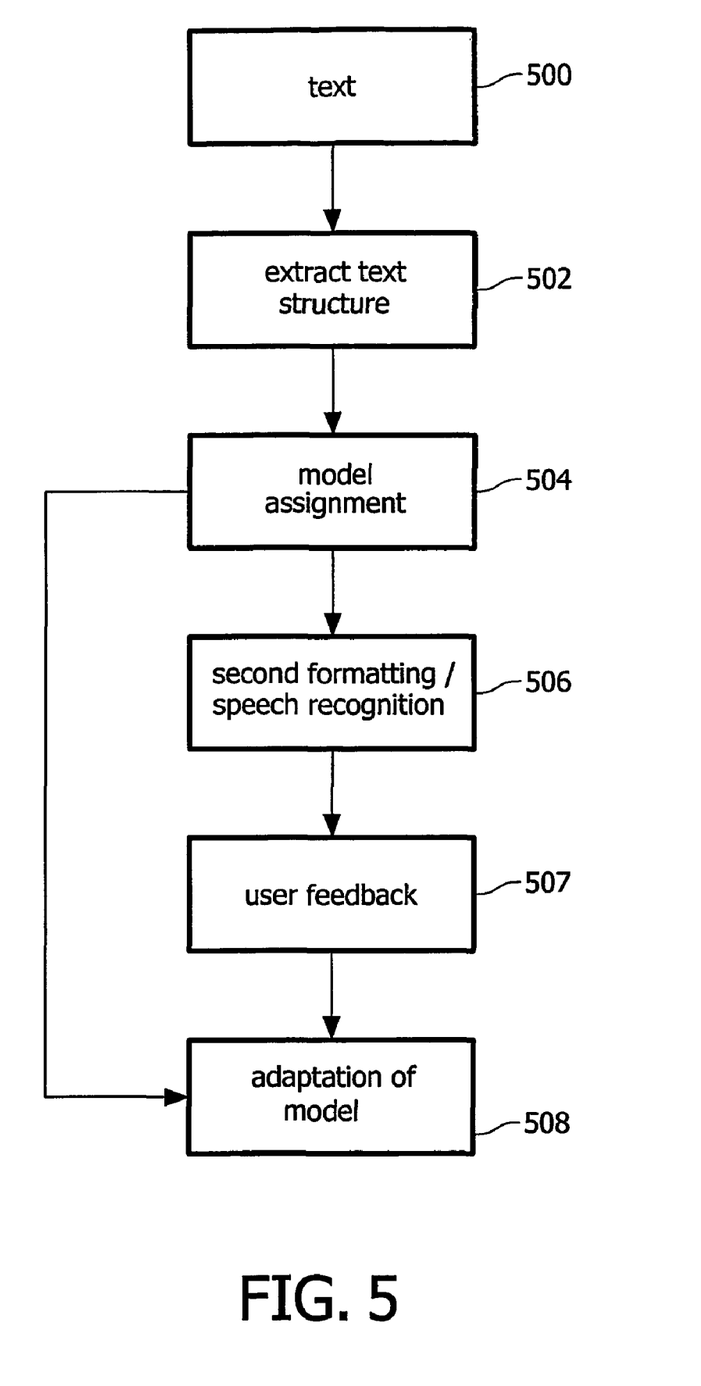
FIG. 5 is illustrative of a flow chart for the customization of language models.

FIG. 5 illustrates a flow chart for an adaptation of the statistical models. In a first step 500, text is provided to the step 502, where the text structure of the provided text is extracted. After the extraction of the text structure, the text as well as the structure are provided to step 504 where an appropriate topic-specific set of models is assigned to each section of the structured text. In the proceeding step 506 a topic-specific speech recognition and/or text formatting is performed. In the proceeding step 507, a user can manually control the performed text formatting and/or speech recognition by manually inserting modifications or rejecting the performed modifications, preferably by means of an undo function. Finally, in the last step 508 the selected models for each section of text are adapted based on the content of the current section which is therefore exploited in addition to the static training data. Therefore step 504 is directly connected to the step 508 in which the model adaptation takes place.

Furthermore this model adaptation takes place after the speech recognition or text formatting step has been performed in step 506 as well as after an eventual manual correction introduced by a user. In this way potential errors that are obtained in the initial text can effectively be eliminated before the statistical models are adapted in step 508. During this adaptation process of step 508, a section of text being assigned to a distinct set of models is statistically analyzed in order to obtain further statistical data which is then incorporated into the appropriate statistical models. In this way the models are permanently subject to adaptation and further training.

Figure 6:
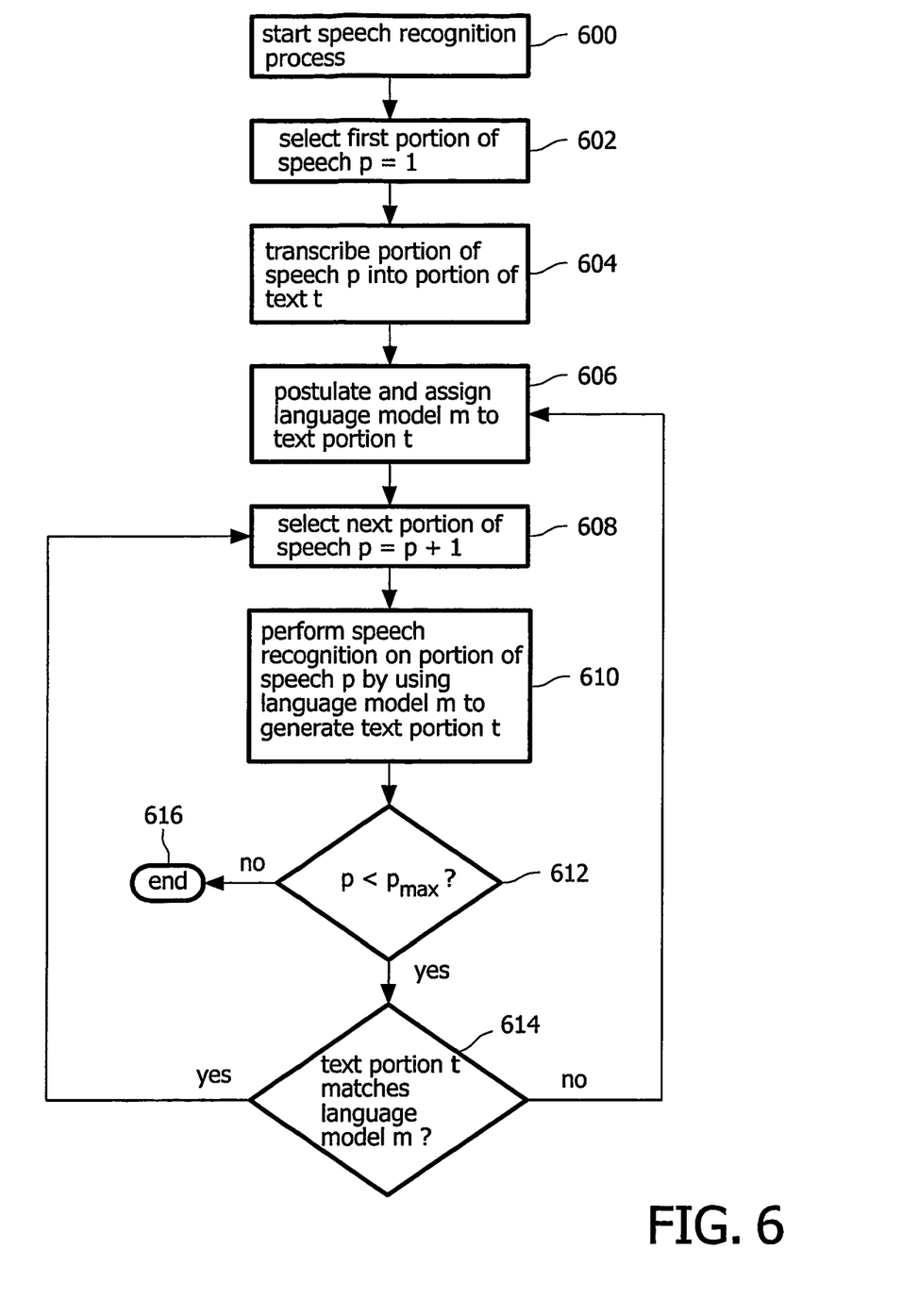
FIG. 6 is illustrative of a flow chart for performing a speech recognition with integrated language model postulation.

FIG. 6 is illustrative of a flow chart in which the selection of a language model is integrated into a speech recognition process. In a first step 600 the speech recognition process is started. In the following step 602 a first portion of speech with p=1 is selected, where p represents a speech portion index. Thereafter in step 604 the selected portion of speech p is transcribed into a corresponding portion of text t. Based on this first text portion t, an appropriate, i.e. best-fitting language model m is assigned to the text portion t in step 606. This approach makes effective use of the fact that the first few words or sentences of a section are characteristic for the content of the section. After the language model m has been assigned to the text portion t in step 606, the next portion of speech p=p+1 is selected in the proceeding step 608.

In the proceeding step 610 a speech recognition of the next portion of speech p is performed by making use of the language model m selected in step 606 to generate a next text portion t. Without any prior treatment like a first speech recognition, the speech is directly recognized by making use of the appropriate language model. In the next step 612 the index of speech portions p is compared to pmax representing the last portion of speech within the speech signal. When in step 612 the speech portion p equals pmax, the method proceeds with step 616 and comes to an end. In the other case when in step 612 the index of speech portion p is less than pmax the method proceeds with step 614.

In step 614 the method checks whether the text portion t transcribed from the portion of speech p still "matches" the language model m that was assigned to the previous text portion t in step 606. When the language model m is still the best-fitting language model for the text portion t, the method returns to step 608, in which the next portion of speech p=p+1 is selected. When in contrast in step 614 a better-fitting other language model is found for the text portion t, the method returns to step 606 in which another best-fitting language model m is assigned to the text portion t. In other words step 614 continuously checks whether the selected language model describes the momentary text portion best among all provided language models. In this way the method is customized to detect section borders acquiring language model transitions.

The division of the speech into portions of speech can be defined according to a user's preferences. These portions can be specified by a predefined time interval or the like.

Figure 7:
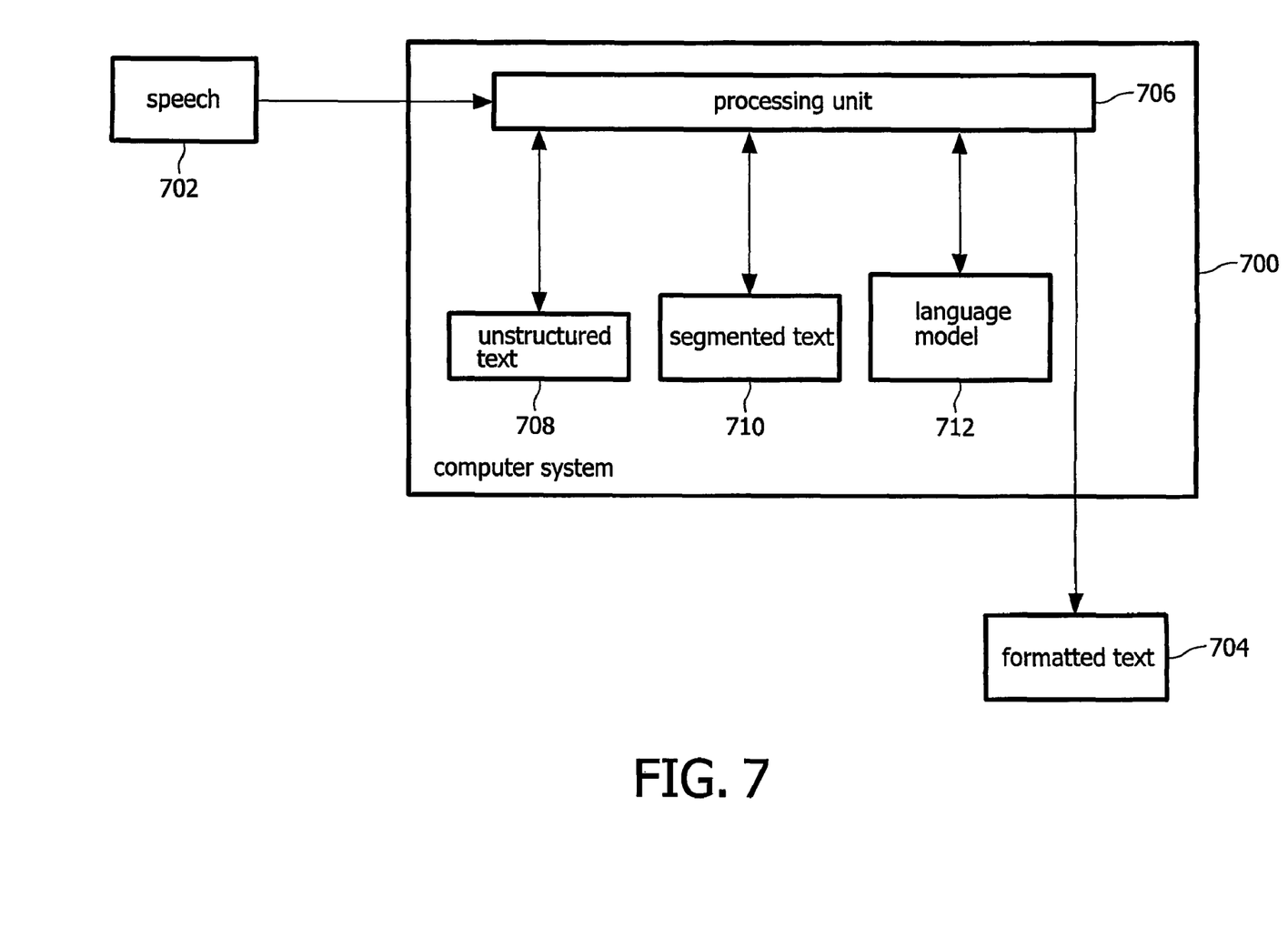
FIG. 7 shows a block diagram of a computer system for speech recognition.

FIG. 7 illustrates a block diagram of a computer system for performing the language model specific speech recognition. The computer system 700 has a processing unit 706, a text storage module 708, a segmented text storage module 710 and a language model module 712. The processing unit 706 further receives speech 702 and performs the speech to text transcription process resulting in text 704 which is outputted from the computer system 700. When the speech 702 is received by the processing unit 706, it is first literally transformed by ordinary speech to text transformation means into unstructured text which is stored in module 708. This first speech to text transformation is performed by the processing unit 706. The following step of text structuring resulting into structured text which is stored in module 710 is also performed by the processing unit 706 on the basis of the unstructured text stored in module 708.

Furthermore the processing unit 706 selects for each section of the structured text stored in module 710 an appropriate language model that is provided by the language model module 712. When the assignment between sections of text and language models has been performed by the processing unit 706, the processing unit proceeds with the second speech recognition process by making explicit use of the rules and the vocabulary provided by each language model for the assigned section. The result of this second speech recognition process which is also performed by the processing unit 706 is outputted from the computer system in the form of text 704. This output can be performed by storing the text by some kind of storing means, e.g. in the form of a file in an electronic file system. Alternatively the generated text 704 can be graphically illustrated by some kind of representation means or it can be reproduced in the form of a print out.

The present invention therefore provides an effective approach for improving speech to text recognition and speech to text transcription systems by making use of text structuring in accordance with context specific assignment of statistical models providing section relevant information in the form of topic specific language models and vocabularies as well as formatting or interpretation rules. The statistical models are based on statistical information gathered from annotated training data.

LIST OF REFERENCE NUMERALS 400 text
402 section
404 section
406 statistical model
408 statistical model
410 language model
412 rule
414 rule
416 language model
418 rule 420 rule
700 computer system
702 speech
704 text
706 processing unit
708 text storage module
710 structured text storage module
712 language model module

The invention claimed is:

1. A computer-implemented method of modifying text data using a set of statistical models being generated on the basis of training data and/or by manual coding, the method of modifying the text comprising operating a computer processing unit to:
segment the text data into a plurality of sections, wherein the text has been generated by a first speech recognition pass;
selectively assign one of the set of statistical models to each section; and
perform a text modification procedure for each section with respect to the statistical model assigned to the section, the text modification procedure comprising a text formatting process for which the assigned statistical model provides formatting rules specific for a topic of the section and further comprising a second speech recognition pass making use of a language model and/or speech recognition parameters of the statistical model being assigned to each section.

2. The method according to any claim 1, wherein each statistical model comprises a topic specific language model and topic specific formatting rules, the language model having a topic specific vocabulary.

3. The method according to any claim 1, wherein the section assigned to a statistical model is analyzed in order to adapt the statistical model to the analyzed section.

4. A method of transcribing speech to text using a set of language models being generated on the basis of training data, the method of transcribing comprising the steps of:
starting a speech recognition process in order to recognize a first portion of speech;
selecting a first language model of the set of language models based on the recognized first portion of speech;
assigning the first language model to the first portion of speech;
continuing the speech recognition process in order to recognize subsequent portions of speech by making use of the first language model;
selecting a second language model and assigning the second language model to a subsequent portion of speech, if the subsequent portion of speech is better modeled by the second language model than by the first language model; and
performing a text modification procedure for each portion with respect to the language model assigned to the portion, the text modification procedure comprising a text formatting process for which the assigned model provides formatting rules specific for a topic of the portion.

5. A method according to claim 1, wherein the statistical models further comprise topic specific speech recognition parameters, in order to provide a topic specific speech recognition pass.

6. A computer system for modifying a text using a set of statistical models being generated on the basis of training data and/or by manual coding, the computer system comprising:
means for segmenting the text into a plurality of sections,
means for assigning one of the set of statistical models to each section, and
means for performing a text modification procedure for each section with respect to the statistical model being assigned to the section, the means for performing the text modification procedure being adapted to accomplish a text formatting procedure for which the assigned statistical model provides formatting rules specific for a topic of the section;
wherein the text has been generated by a first speech recognition pass, the means for performing the text modification procedure are adapted to accomplish a second speech recognition pass making use of the language model and/or speech recognition parameters of the statistical model being assigned to each section.

7. The computer system according to claim 6, wherein each statistical model comprises a topic specific language model and topic specific formatting rules, the language model having a topic specific vocabulary.

8. The computer system according to claim 6, further comprising means for analyzing the section assigned to a statistical model, in order to adapt the statistical model to the analyzed section.

9. A computer system for transcribing speech to text using a set of language models being generated on the basis of training data, the computer system comprising:
means for starting a speech recognition process, the means being adapted to recognize a first portion of speech,
means for selecting a first language model of the set of language models based on the recognized first portion of speech and means for assigning the first language model to the first portion of speech,
means for continuing the speech recognition process being adapted to recognize subsequent portions of speech by making use of the first language model,
means for selecting a second language model and assigning the second language model to subsequent portion of speech, if a subsequent portion of speech is better modeled by the second language model than by the first language model, and
means for performing a text modification procedure for each portion with respect to the language model assigned to the portion, the text modification procedure comprising a text formatting process for which the assigned model provides formatting rules specific for a topic of the portion.

10. A computer program product for modifying a text using a set of statistical models being generated on the basis of training data and/or by manual coding, the computer program product comprising a non-transitory computer-readable storage medium encoded with computer-executable instructions which when executed by a computer processing unit:
segment the text, generated from a speech recognition pass, into a plurality of sections,
assign one of the set of statistical models to each section, and
perform a text modification procedure for each section based upon the statistical model assigned to the section, wherein the text modification procedure being adapted to accomplish a text formatting procedure for which the assigned statistical model provides formatting rules being specific for a topic of the section;
wherein the text has been generated by a first speech recognition pass, the text modification procedure being adapted to accomplish a second speech recognition pass making use of a language model and/or speech recognition parameters being assigned to each section.

11. The computer program product according to claim 10, wherein each statistical model comprises a topic specific language model and topic specific formatting rules, the language model having a topic specific vocabulary.

12. The computer program product according to claim 10, further comprising means for analyzing a section assigned to a statistical model, in order to adapt the statistical model to the analyzed section.

13. A computer program product for transcribing speech to text using a set of language models being generated on the basis of training data and/or by manual coding, the computer program product comprising a non-transitory computer-readable storage medium encoded with computer-executable instructions which when executed by a computer processing unit:

start a speech recognition process, in order to recognize a first portion of speech, select a first language model of the set of language models based on the recognized first portion of speech and assigning the first language model to the first portion of speech, continue the speech recognition process in order to recognize subsequent portions of speech by making use of the first language model, select a second language model and assign the second language model to a subsequent portion of speech, if the subsequent portion of speech is better modeled by the second language model than by the first language model, and perform a text modification procedure for each portion with respect to the language model assigned to the portion, the text modification procedure comprising a text formatting process for which the assigned model provides formatting rules specific for a topic of the portion.

\* \* \* \* \*